US009608816B2

(12) United States Patent
Androulaki et al.

(10) Patent No.: US 9,608,816 B2
(45) Date of Patent: *Mar. 28, 2017

(54) SHARED DATA ENCRYPTION AND CONFIDENTIALITY

(71) Applicant: International Business Machines Corporation, Armonk, NY (US)

(72) Inventors: Elli Androulaki, Arianestrasse (CH); Nathalie Baracaldo, Pittsburgh, PA (US); Joseph S. Glider, Palo Alto, CA (US); Alessandro Sorniotti, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/161,728

(22) Filed: May 23, 2016

(65) Prior Publication Data

US 2016/0267291 A1    Sep. 15, 2016

Related U.S. Application Data

(63) Continuation of application No. 14/470,215, filed on Aug. 27, 2014, now Pat. No. 9,397,832.

(51) Int. Cl.
*H04L 29/06* (2006.01)
*H04L 9/14* (2006.01)
(Continued)

(52) U.S. Cl.
CPC .............. *H04L 9/14* (2013.01); *G06F 3/0641* (2013.01); *G06F 17/30* (2013.01); *G06F 21/602* (2013.01);
(Continued)

(58) Field of Classification Search
CPC ... H04L 9/14; H04L 2209/24; G06F 12/1408; G06F 2212/1052; G06F 21/6218;
(Continued)

(56) References Cited

U.S. PATENT DOCUMENTS 5,684,876 A * 11/1997 Pinder .................. H04N 7/1675
                                                            348/E7.056
5,805,699 A     9/1998 Akiyama et al.
(Continued)

OTHER PUBLICATIONS

Kim et al, "An Energy-Efficient Selective Encryption Scheme for Wireless Multimedia Sensor Networks," Dec. 2012, pp. 499-505.
(Continued)

*Primary Examiner* — Hadi Armouche
*Assistant Examiner* — Shahriar Zarrineh
(74) *Attorney, Agent, or Firm* — Lieberman & Brandsdorfer, LLC

(57) ABSTRACT

Embodiments relate to deduplication and compression on data performed downstream from where the data is encrypted. Confidentiality of data is maintained, and the ability of storage systems to perform data reduction functions is supported. Encrypted data to be written to a storage system is separated into one or more data chunks. For a data chunk, a master encryption key for an owning entity associated with the data chunk is retrieved. The data chunk is decrypted into plaintext, and the plaintext is transformed by performing one or more advanced data functions. A private key is created and used to encrypt the transformed plaintext, which is stored as a first encryption unit. A wrapped key is created by encrypting the private key with the master key, and is stored as metadata for the encryption unit to limit data access to the owning entity.

12 Claims, 7 Drawing Sheets

(51) Int. Cl.
| | |
|---|---|
| *G06F 3/06* | (2006.01) |
| *G06F 21/60* | (2013.01) |
| *G06F 21/62* | (2013.01) |
| *H04L 9/08* | (2006.01) |
| *G06F 17/30* | (2006.01) |
| *H04L 29/08* | (2006.01) |

(52) U.S. Cl.
CPC ........ G06F 21/6218 (2013.01); H04L 9/0825 (2013.01); H04L 9/0861 (2013.01); H04L 9/0894 (2013.01); H04L 63/045 (2013.01); *G06F 3/0619* (2013.01); *G06F 3/0685* (2013.01); *G06F 2221/2107* (2013.01); *H04L 63/061* (2013.01); *H04L 67/1097* (2013.01); *H04L 2209/30* (2013.01); *H04L 2463/062* (2013.01)

(58) Field of Classification Search
CPC ............. G06F 21/6227; G06F 21/6236; G06F 21/6245; G06F 21/6254; G06F 21/6263; G06F 21/6272; G06F 21/6281; G06F 21/629; G06F 2212/402
USPC ......................................................... 713/193
See application file for complete search history.

(56) References Cited

U.S. PATENT DOCUMENTS

| | | | |
|---|---|---|---|
| 5,938,734 A * | 8/1999 | Yao .................... | H04N 7/17336 348/E5.008 |
| 6,341,164 B1 | 1/2002 | Dilkie et al. | |
| 7,194,620 B1 | 3/2007 | Hayes | |
| 7,254,838 B2 * | 8/2007 | Kim ........................ | G06F 21/10 380/201 |
| 7,965,844 B2 | 6/2011 | Greco et al. | |
| 8,117,464 B1 * | 2/2012 | Kogelnik ............ | H04L 63/0428 380/284 |
| 8,320,560 B2 | 11/2012 | Orsini et al. | |
| 8,379,845 B2 | 2/2013 | Gondkar et al. | |
| 8,479,304 B1 | 7/2013 | Clifford | |
| 8,495,392 B1 * | 7/2013 | Bardale ................... | G06F 21/62 711/117 |
| 8,650,157 B1 * | 2/2014 | Jha ...................... | G06F 11/1456 707/640 |
| 8,661,259 B2 * | 2/2014 | Yocom-Piatt ....... | G06F 11/1453 713/176 |
| 8,782,441 B1 | 7/2014 | Osterwalder et al. | |
| 8,812,874 B1 * | 8/2014 | Clifford .............. | G06F 21/6209 713/193 |
| 8,996,881 B2 * | 3/2015 | Fiske .................... | G06F 21/602 713/189 |
| 9,037,870 B1 * | 5/2015 | Zheng ................. | G06F 12/1408 380/273 |
| 9,081,771 B1 * | 7/2015 | Faibish ................... | G06F 17/30 |
| 2004/0177267 A1 * | 9/2004 | Tada ............. | H04N 21/234318 713/193 |
| 2004/0255133 A1 | 12/2004 | Lei et al. | |
| 2007/0280483 A1 * | 12/2007 | Fu ........................ | H04L 9/0822 380/286 |
| 2008/0077806 A1 | 3/2008 | Cui et al. | |
| 2008/0317246 A1 | 12/2008 | Manders et al. | |
| 2009/0190760 A1 * | 7/2009 | Bojinov ................ | G06F 3/0608 380/269 |
| 2009/0296926 A1 | 12/2009 | Perlman | |
| 2009/0323940 A1 | 12/2009 | Moffat et al. | |
| 2010/0115286 A1 | 5/2010 | Hawkes et al. | |
| 2010/0162001 A1 | 6/2010 | Dodgson | |
| 2010/0198797 A1 | 8/2010 | Wideman et al. | |
| 2010/0306412 A1 | 12/2010 | Therrien et al. | |
| 2010/0313036 A1 * | 12/2010 | Lumb ................... | G06F 21/602 713/189 |
| 2011/0022718 A1 | 1/2011 | Evans et al. | |
| 2011/0102546 A1 | 5/2011 | Dhuse et al. | |
| 2011/0170687 A1 | 7/2011 | Hyodo et al. | |
| 2011/0320805 A1 | 12/2011 | Chaves et al. | |
| 2012/0084523 A1 | 4/2012 | Littlefield et al. | |
| 2012/0166745 A1 | 6/2012 | Retnamma et al. | |
| 2012/0195425 A1 | 8/2012 | Kim et al. | |
| 2012/0204024 A1 * | 8/2012 | Augenstein ......... | G06F 11/1453 713/150 |
| 2012/0243688 A1 | 9/2012 | Hirsch | |
| 2013/0103945 A1 * | 4/2013 | Cannon ............... | G06F 21/6209 713/168 |
| 2013/0262868 A1 | 10/2013 | Friedman et al. | |
| 2013/0305037 A1 | 11/2013 | Puttaswamy Naga et al. | |
| 2013/0305039 A1 | 11/2013 | Gauda | |
| 2013/0311789 A1 | 11/2013 | Johnson et al. | |
| 2014/0025948 A1 * | 1/2014 | Bestler .................. | H04L 9/0863 713/167 |
| 2014/0032925 A1 * | 1/2014 | Panchbudhe ......... | G06F 3/0608 713/189 |
| 2014/0040616 A1 | 2/2014 | Barber et al. | |
| 2014/0082376 A1 | 3/2014 | Roden et al. | |
| 2014/0095892 A1 | 4/2014 | Lai et al. | |
| 2014/0189348 A1 | 7/2014 | El-Shimi et al. | |
| 2014/0281486 A1 * | 9/2014 | Nayshtut ............. | G06F 21/6227 713/153 |
| 2014/0359276 A1 | 12/2014 | Resch et al. | |
| 2015/0026464 A1 * | 1/2015 | Hanner, Sr. ......... | H04L 63/0245 713/168 |

OTHER PUBLICATIONS

Osuna et al., "Implementing IBM Storage Data Deduplication Solutions," IBM Redbooks, Mar. 2011, pp. 1-322, First Edition.
Wang et al., "Deduplication-Oriented Backup-Data Encryption Method," Journal of Computer Applications, Jul. 2010, pp. 1-5, vol. 30, No. 7.
Wang et al., "A Novel Encryption Scheme for Data Deduplication System," School of Computer Science and Engineering, University of Electronic Science and Technology of China, Chengdu, China, 2010, pp. 265-269.
Unknown, "Security for Shared Data Spaces," An IP.com Prior Art Database Technical Disclosure, Jul. 30, 2007, pp. 1-16.
Internet Society et al., "Telnet Data Encryption Option (RFC2946)", An IP.com Prior Art Database Technical Disclosure, Sep. 1, 2000, pp. 1-10.

* cited by examiner

SHARED DATA ENCRYPTION AND CONFIDENTIALITY

CROSS-REFERENCE TO RELATED APPLICATION(S)

This application is a continuation patent application claiming the benefit of the filing date of U.S. patent application Ser. No. 14/470,215, filed on Aug. 27, 2014 and titled "Shared Data Encryption and Confidentiality", now pending, which is hereby incorporated by reference.

BACKGROUND

The present invention relates to encryption and confidentiality of data on an external data storage system. More specifically, the invention relates to data reduction, including compression and de-duplication associated with storing encrypted data on the external storage system.

End-to-end encryption is the process of encrypting data close to the source before committing the encrypted data to storage. This encryption process has become increasingly prevalent due to security concerns regarding third party storage or cloud providers, domain-specific regulations mandating the encryption of sensitive data, ensuring secure deletion of data, and encryption requirements in high-security data centers. The client is the only entity in control of keys used to encrypt the data. Accordingly, no information is revealed to the cloud provider or other cloud provider tenants.

Encrypting data is limiting however, in that the majority of storage efficiency functions do not achieve their intended functions when operating on encrypted data. Encrypting data maximizes the entropy of ciphertext. As a consequence, encrypted data cannot be compressed. Furthermore, encryption of the same content in two different files or two different locations results in different ciphertexts, resulting in the failure of standard deduplication attempts.

SUMMARY

The invention includes a method, computer program product, and system for reconciling storage efficiency and data confidentiality.

A method, computer program product, and system are provided for creation of encryption units and performing of advanced data functions, such as data reduction, on plaintext data therein, while maintaining data confidentiality. Encrypted data to be written to a storage system is separated into one or more data chunks. For a first data chunk, a first master encryption key for a first owning entity associated with the data chunk is retrieved. The first data chunk is decrypted into plaintext, and the plaintext is transformed by performing one or more advanced data function techniques. A first private key is created. The transformed plaintext is encrypted with the first private key, and stored as an encryption unit. A first wrapped key is created using the retrieved first master encryption key by encrypting the first private key with the retrieved first master key. The first wrapped key limits data access to the first owning entity. The first wrapped key is stored as metadata for the first encryption unit.

Other features and advantages of this invention will become apparent from the following detailed description of the presently preferred embodiment(s) of the invention, taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments of the invention, and not of all embodiments of the invention unless otherwise explicitly indicated.

DETAILED DESCRIPTION

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

A decrypter, as described hereafter, is a component within a data path between an application generating and/or using data and a persistent medium where generated and/or used data is stored. In one embodiment, the decrypter is contained within a compute node, wherein the compute node is a physical or logical entity. When granted permission, the decrypter has access to encryption keys and metadata containing sufficient information pertaining to ciphertext to allow for decryption. Furthermore, the decrypter has the ability to obtain one or more decryption key(s) required to decrypt into plaintext, i.e. a non-encrypted data format, the transmitted ciphertext, i.e. the encrypted version of the data block(s). Once the original plaintext is available, the decrypter can operate on the plaintext directly, to perform required storage efficiency functions or other functions which require the data to be in an unencrypted form. In one embodiment, the decrypter does not require any modification to an encryption algorithm. In another embodiment, the decrypter is placed downstream with respect to where the encryption was first performed, and does not require relocation of the component performing encryption. Accordingly, in one embodiment, the decrypter is a secure component or module in which data is prepared for storage in a persistent device, e.g. back-end storage, or passed to another data processing component.

Figure 1:
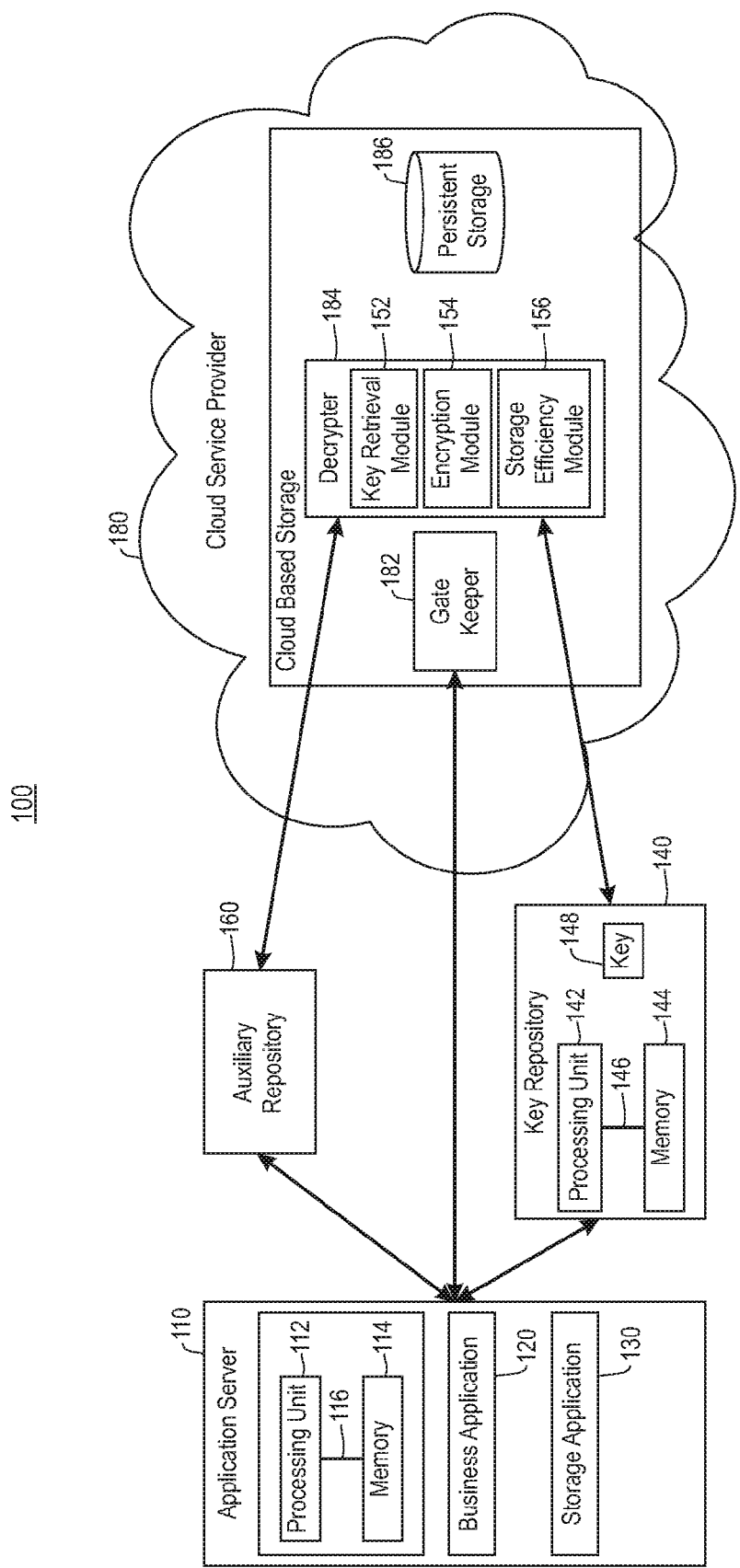
FIG. 1 depicts a block diagram illustrating components embedded in a computer system to support a technique for efficiently storing encrypted data according to an embodiment of the present invention.

FIG. 1 is a block diagram (100) illustrating components embedded in a computer system to support a technique for efficiently storing encrypted data, and in one embodiment to enable de-duplication or compression of encrypted data. There are two primary components shown herein, including an application server (110), and a provider for a shared pool of resources (180), also referred to herein as a cloud service provider. The application server (110) is comprised of four sub-components, including a business application (120), a storage application (130), a key repository (140) and an auxiliary repository (160). The business application (120) generates data that is to be outsourced. In one embodiment, the data generated by the business application (120) is outsourced to a cloud based storage system, e.g. data storage in communication with the shared pool of resources (180), and the storage application (130) serves as an intermediary between the business application (120) and the cloud service provider (180), receiving storage requests such as read or write request from the business application (120), possibly encrypting the data to be stored and decrypting data being read, deciding where the data is to be stored or fetching it where it has been stored, and creating appropriate requests to the cloud service provider (180) to cause data to be stored or read. The key repository (140) maintains encryption keys for data encryption, and in one embodiment, functions to provide user authentication prior to distribution of one or more keys to a requesting entity. In one embodiment, a key is uniquely owned and controlled by an entity running a business application (120), and the key repository (140) ensures that the keys are properly distributed through authentication, thereby ensuring that the data is both secure and accessible. In one embodiment, encryption is an algorithm or process that converts data to ciphertext, and a correct decryption algorithm reverses the work of the encryption algorithm. In one embodiment, the storage application (130) fetches the appropriate key from the key repository (140) for encryption of data prior to storage. Similarly, in another embodiment, the data is encrypted using a data object key, or a private key, selected by the storage application, and the private key is wrapped in the master key fetched from the key repository (140), e.g. encrypted with the master key, and stored in metadata and the auxiliary repository.

Once encrypted, the auxiliary repository (160) maintains metadata on the type of encryption used for each part of uploaded data, possibly including information needed to identify the key repository where the master key is stored, the encryption type, and seeds or initialization vectors used in the encryption algorithm. In one embodiment, each time the storage application (130) encrypts data, the auxiliary repository (160) receives an update with corresponding metadata. Accordingly, the storage application (130) component in the application server (110) functions to encrypt data to maintain confidentiality of the encrypted data.

The shared pool of resources (180) is comprised of three primary components, including a gatekeeper (182), a decrypter (184), and persistent storage device(s) (186). The gatekeeper (182) functions as an interface between the application server (110) and the decrypter (184). In one embodiment, the gatekeeper (182) intercepts data storage requests and performs a first level of access authorization to a requested resource. All valid requests are forwarded from the gatekeeper (182) to the decrypter (184). The functionality of processing read and write requests is performed by the decrypter (184). For write requests, the decrypter (184) decrypts received data, deduplicates the data, compresses the data, encrypts the data, and forwards the re-encrypted data to persistent storage (186). For a read request, the decrypter (184) retrieves the compressed and/or deduplicated data from persistent storage (186), decrypts the data, re-inflates the data, re-encrypts it and sends the processed data to the requesting entity. The decrypter (184) communicates with both the key repository (140) and the auxiliary repository (160) to obtain appropriate information to decrypt and re-encrypt data in support of the received requests.

The application server (110) is provided with a processing unit (112) in communication with memory (114) across a bus (116). The application server (110) is shown with a storage application (130) to support encryption of a data object prior to sending the data object to a storage system. In one embodiment, the storage application (130) employs a key (148) for the encryption. The key is stored in the key repository (140), which is shown in communication with the application server (110). The location of the key repository (140) is not restricted. Although in one embodiment, the key repository remains under control of administration by the application server (110).

As shown, the key repository (140) is provided in communication with both the application server (110) and the decrypter (184). In the embodiment shown herein, the key respository (140) is provided with a processing unit (142) in communication with memory (144) across a bus (146). One or more encryption keys (148), hereinafter referred to as a key, are stored local to the key repository (140), and are employed to encrypt and decrypt data. For illustrative purposes, only one key (148) is shown, although in one embodiment, a plurality of keys may be stored local to the key repository (140). As shown, the key (148) is stored local to memory (144), although in one embodiment, the key (148) may be stored in persistent storage (not shown) local to the key repository (140) or in one or more secure components specifically designed to protect the keys against unauthorized access. In one embodiment, the auxiliary repository (160) is provided in communication with both the application server (110) and the decrypter (184), and at the same time is also separate from the key repository (140).

Data that is written to the storage is separated into units referred to herein as data chunks. In one embodiment, the data chunk is a fixed size. A signature is calculated for each data chunk. In one embodiment, the signature is stored in a deduplication table that maintains a pointer to the location of the stored data chunk. When a write operation is identical to an already written chunk, the deduplication table is updated with a pointer to the physical block address where the previously stored data chunk is located so that the same information is not stored twice. Accordingly, the signature is employed to detect duplication by comparing signatures with data chunks already stored in the storage system.

One or more data chunks written by an owning entity are combined and encrypted, and stored within an encryption unit; a unit of data that is encrypted separately from other encryption units. Each data chunk is separately addressable in the storage system and can be individually accessed. Furthermore, each entity storing or accessing data in the system has a different master encryption key used to ensure that the entity has limited access, and that the data is only accessible to limited entities. Accordingly, the master encryption key limits data access to the entity that either stored the data, or the entity that has received access to the stored data.

The decrypter (184) includes modules to facilitate functionality with respect to de-duplication of encrypted data to support efficient data storage. As shown, the decrypter (184) includes a key retrieval module (152), an encryption module (154), and a storage efficiency module (156). The key retrieval module (152) functions to retrieve a master encryption key from an owning entity of a data chunk. The encryption module (154) functions to decrypt and encrypt data. The storage efficiency module (156) functions to apply advanced data functions, such as data reduction functions (or the reverse functions) on the data in its plaintext form. In one embodiment, the advanced data functions may include, but are not limited to, deduplication techniques, compression, etc. More specifically, the encryption module (154) functions to create private keys, encrypt plaintext of the associated data chunk with the created private key, and to form an encryption unit suitable for storage. Similarly, the encryption module (154) may use the master encryption key to create a wrapped key, e.g. encryption of the private key with the master key, and to store the wrapped key as metadata for the underlying and encrypted data chunk.

The encrypted data chunk may be owned and exclusive to a single entity. Similarly, in one embodiment, the encrypted data chunk may be shared by two or more entities. In the event of a shared data chunk, a second wrapped key may be created. More specifically, the key retrieval module (152) functions to retrieve the first wrapped key and the first master key associated with the shared data chunk. The retrieval module (152) then decrypts the first wrapped key with the first master key, and creates a second wrapped key with a second master key associated with a second entity designated as a shared owner of the underlying data chunk. Similar to the data chunk that is not shared, the encryption module (154) stores the second wrapped key as metadata for the underlying and encrypted data chunk.

As identified above, the key retrieval module (152), the encryption module (154), and the storage efficiency module (156) are shown residing in the functional unit (180) of the decrypter (184). Although in one embodiment, the functional unit (180) and modules (152)-(156) may reside as hardware components external to the functional unit (180). In another embodiment, the modules (152)-(156) may be implemented as a combination of hardware and software in the shared pool of resources (180). Similarly, in one embodiment, the modules (152)-(156) may be combined into a single functional item that incorporates the functionality of the separate items. As shown herein, each of the modules (152)-(156) are shown local to the decrypter (184). However, in one embodiment they may be collectively or individually distributed across a shared pool of configurable computer resources and function as a unit to support decryption, data manipulation, and re-encryption. Accordingly, the modules may be implemented as software tools, hardware tools, or a combination of software and hardware tools.

Furthermore, the described features, structures, or characteristics may be combined in any suitable manner in one or more embodiments. Examples of modules have been provided to lend a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The functional unit(s) described above in FIG. 1 has been labeled with modules. A module may be implemented in programmable hardware devices such as field programmable gate arrays, programmable array logic, programmable logic devices, or the like. The module(s) may also be implemented in software for processing by various types of processors. An identified module of executable code may, for instance, comprise one or more physical or logical blocks of computer instructions which may, for instance, be organized as an object, procedure, function, or other construct. Nevertheless, the executable of an identified module need not be physically located together, but may comprise disparate instructions stored in different locations which, when joined logically together, comprise the modules and achieve the stated purpose of the modules.

Indeed, a module of executable code could be a single instruction, or many instructions, and may even be distributed over several different code segments, among different applications, and across several memory devices. Similarly, operational data may be identified and illustrated herein within the module, and may be embodied in any suitable form and organized within any suitable type of data structure. The operational data may be collected as a single data set, or may be distributed over different locations including over different storage devices, and may exist, at least partially, as electronic signals on a system or network.

Figure 2:
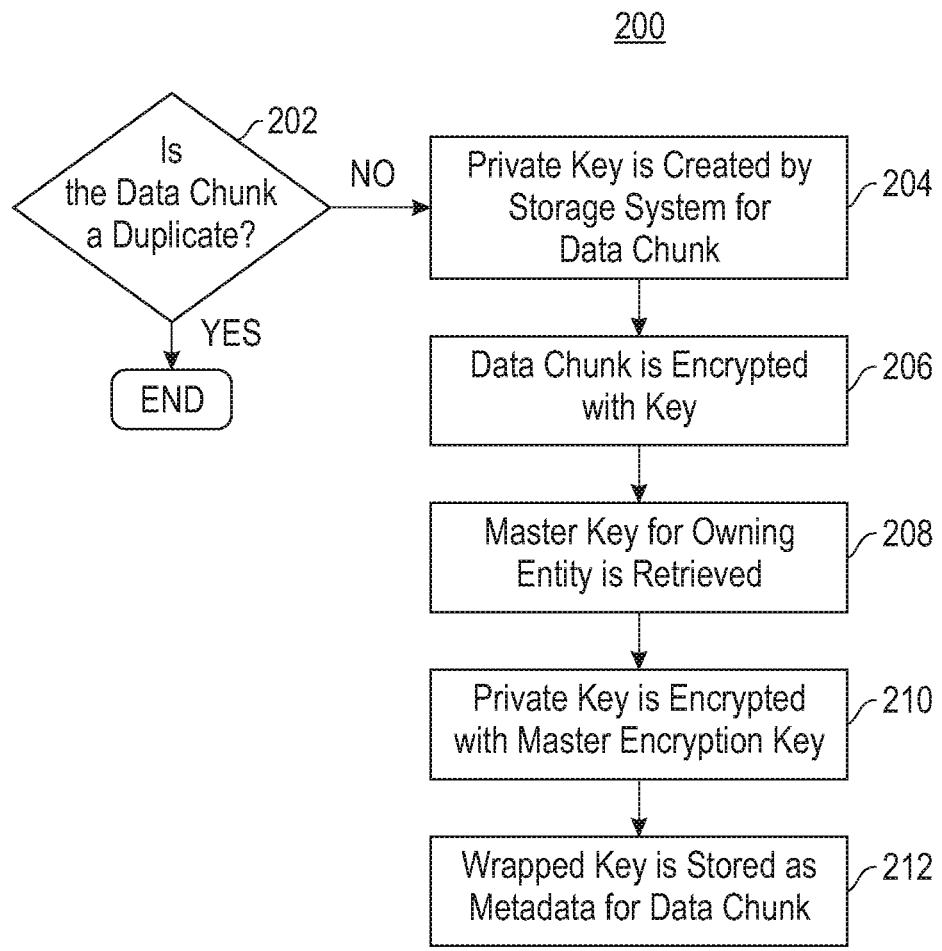
FIG. 2 depicts a flow chart illustrating a process for storing a non-duplicate data chunk.

With reference to FIG. 2, a flow chart (200) is provided illustrating a process for storing a non-duplicate data chunk. The first step involves ascertaining if the data chunk is a duplicate (202). As indicated herein, a signature is calculated for each data chunk, and the signature is stored in a common location, also referred to herein as an index. If it is determined that the data chunk is a duplicate, the process for ascertaining a duplicate data chunk shown herein concludes, and then proceeds to the process shown in FIG. 3 pertaining to storage of duplicate data chunks. Once it has been determined that the data chunk is not a duplicate, a private key is created by the storage system for the data chunk (204), and the data chunk is encrypted with the key (206). In one embodiment, the private key is referred to as a random key. One or more data chunks are combined and encrypted to form an encryption unit. The owning entity that created the data chunk or otherwise has been granted access to the data chunk has an encryption key, referred to herein as the master encryption key. The master encryption key from the owning entity is retrieved (208), and the private key is encrypted with the master encryption key (210), also referred to herein as wrapping the private key, e.g. creating a wrapped key. The wrapped key is stored as metadata for the data chunk (212). Accordingly, an encryption unit is created for each non-duplicate data chunk, and the private key for the encryption unit is wrapped and stored as metadata for the encryption unit.

Figure 3:
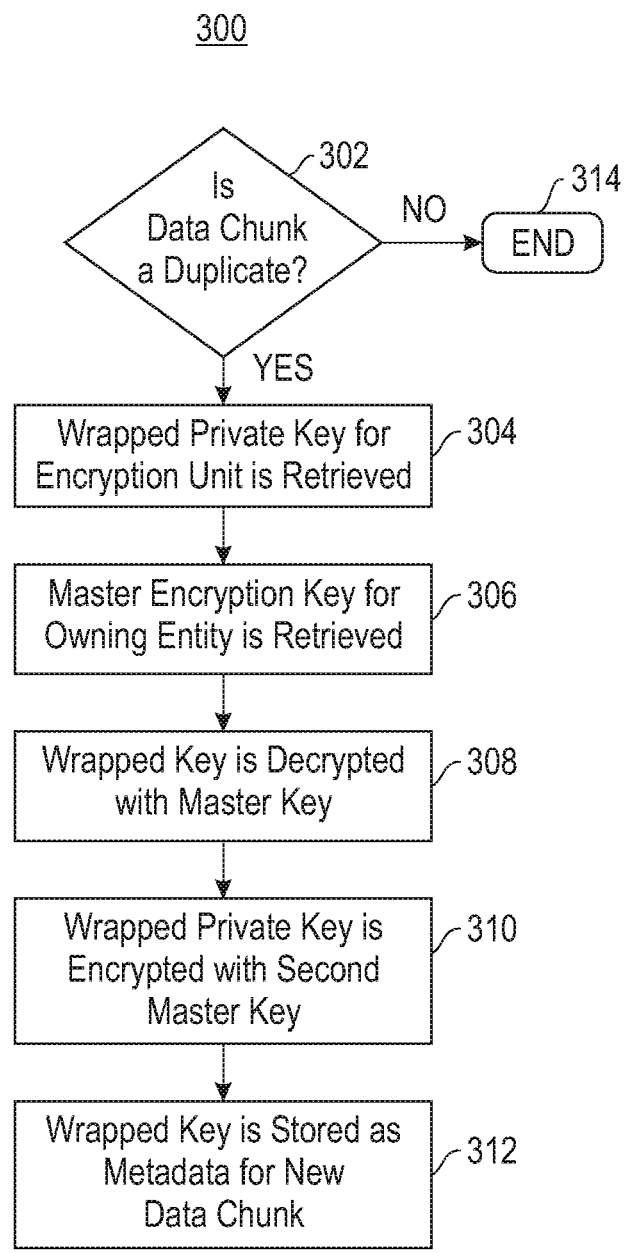
FIG. 3 depicts a flow chart illustrating a process for storing a duplicate data chunk.

As explained herein, a data chunk may be a duplicate with a pointer to the location of the stored data chunk, or a non-duplicate. Referring to FIG. 3, a flow chart (300) is provided illustrating a process for storing a duplicate data chunk. In one embodiment, the duplicate data chunk is a new data chunk. The first step involves ascertaining that the data chunk is a duplicate (302). In one embodiment, the duplication includes one or more data chunks with the same content as other written data chunks, also referred to herein as a data chunk with the same content. As indicated herein, a signature is calculated for each data chunk, and the signature is stored in a common location, also referred to herein as an index. If the data chunk is not identified as a duplicate, the duplication data chunk evaluation process concludes (314), and in one embodiment returns to step (204) of FIG. 2. However, if it has been determined that the data chunk is a duplicate, the wrapped private key for the encryption unit is retrieved (304). In addition, the master encryption key for the owning entity is retrieved (306). In one embodiment, the master encryption key pertains to the already stored data chunk with the same content as the new data chunk. With both keys retrieved, the wrapped key is decrypted with the master key (308). Thereafter, the wrapped private key is once again encrypted, but this time with a second master key associated with a second owning entity of the already stored data chunk, also referred to herein as a shared data chunk, (310). The wrapped key is stored as metadata for the new data chunk (312). Accordingly, a second wrapped key may be encrypted for a shared encryption unit, with the second wrapped key stored as metadata for the shared encryption unit.

Figure 4:
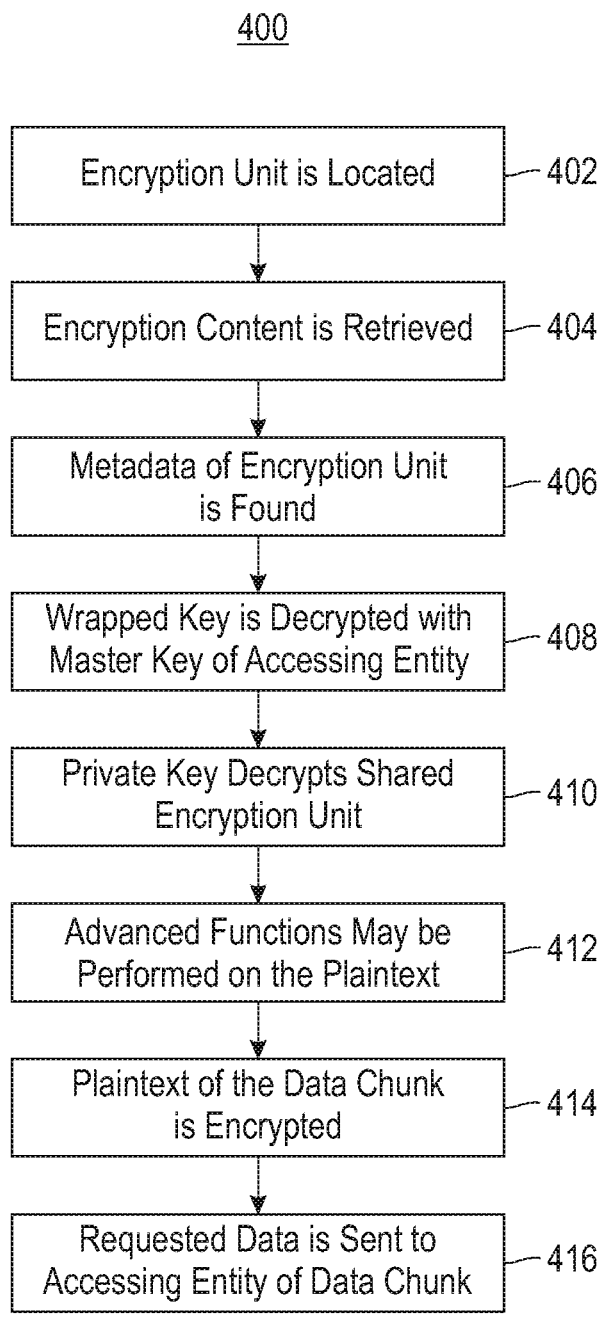
FIG. 4 depicts a flow chart illustrating a process for accessing a shared data chunk.

As shown in FIGS. 2 and 3, shared or non-shared data chunks are stored in encryption units. Shared data chunks stored in encryption units may be accessed by more than one owning entity. Referring to FIG. 4, a flow chart (400) is provided illustrating a process for accessing a shared encryption unit. The location of the encryption unit is ascertained (402) and the encrypted content is retrieved (404). As shown in FIG. 3, the wrapped key is stored as metadata of the shared encryption unit. The metadata of the located encryption unit is found (406), including the second wrapped encryption key. The wrapped key is decrypted with the master key assigned to the accessing entity (408). Thereafter, the underlying encryption key, also referred to as a private key, is used to decrypt the shared encryption unit (410). Once the encryption unit has been decrypted advance functions may be performed on the plaintext (412), e.g. restoring the non-compressed format of the data within the data chunk. Following step (412), the plaintext of the data chunk is again encrypted according to the encryption format and keys used by the storage application (414) and the requested data are sent to the accessing entity of the data chunk (416). Accordingly, a shared encryption unit may be accessed by one of the owning entities through use of the stored metadata and the associated master key.

As demonstrated in FIGS. 2-4, the application server encrypts data objects, and separates the data objects and the data therein into one or more data blocks. Each data block is identified by its data object offset. Furthermore, each entity has its own encryption key, which in one embodiment is stored in the key repository (140). In one embodiment, for each data object, the system generates a unique and ephemeral data object key, or private key, which is used to encrypt the blocks of the data object. The private key is generated by the storage application, and in one embodiment can be stored with data object metadata. To ensure that the data object can only be accessed by an owning entity, the private key is encrypted with the master encryption key of the owning entity. In one embodiment, there may be one master encryption key for two or more private keys, with each wrapped private key stored or identified in a metadata entry for the data object.

As described and illustrated herein, the decrypter is supported by the application server, as demonstrated in the system diagram and flow charts. In one embodiment, the functionality of the decrypter may be extrapolated to a cloud computing environment with a shared pool of resources.

Figure 5:
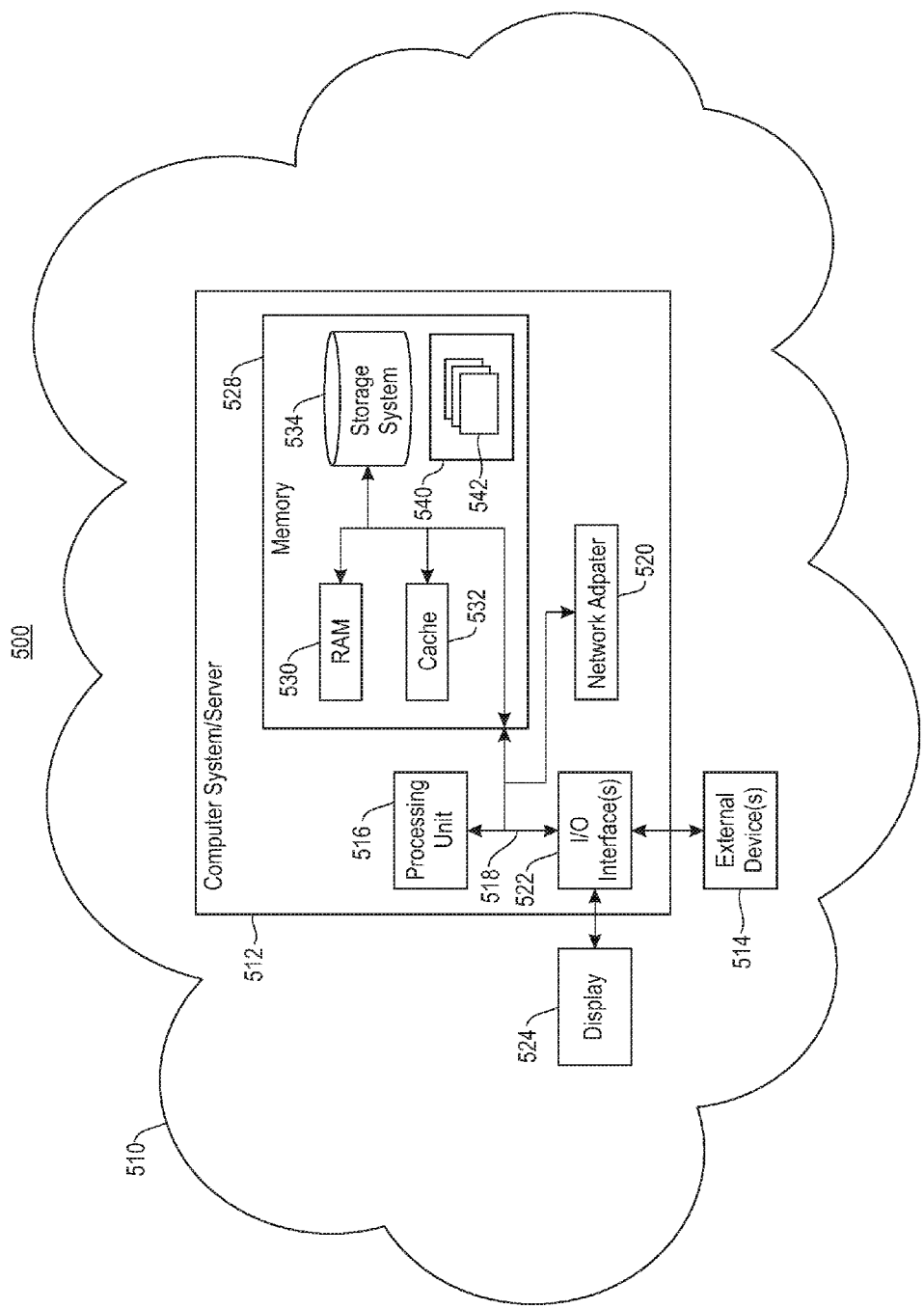
FIG. 5 depicts an example of a cloud computing node.

A cloud computing environment is service oriented with a focus on statelessness, low coupling, modularity, and semantic interoperability. At the heart of cloud computing is an infrastructure comprising a network of interconnected nodes. Referring now to FIG. 5, a schematic of an example of a cloud computing node is shown. Cloud computing node (510) is only one example of a suitable cloud computing node and is not intended to suggest any limitation as to the scope of use or functionality of embodiments of the invention described herein. Regardless, cloud computing node (510) is capable of being implemented and/or performing any of the functionality set forth hereinabove. In cloud computing node (510) there is a computer system/server (512), which is operational with numerous other general purpose or special purpose computing system environments or configurations. Examples of well-known computing systems, environments, and/or configurations that may be suitable for use with computer system/server (512) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server (512) may be described in the general context of computer system-executable instructions, such as program modules, being executed by a computer system. Generally, program modules may include routines, programs, objects, components, logic, data structures, and so on that perform particular tasks or implement particular abstract data types. Computer system/server (512) may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server (512) in cloud computing node (510) is shown in the form of a general-purpose computing device. The components of computer system/server (512) may include, but are not limited to, one or more processors or processing units (516), system memory (528), and a bus (518) that couples various system components including system memory (528) to processor (516). Bus (518) represents one or more of any of several types of bus structures, including a memory bus or memory controller, a peripheral bus, an accelerated graphics port, and a processor or local bus using any of a variety of bus architectures. By way of example, and not limitation, such architectures include an Industry Standard Architecture (ISA) bus, a Micro Channel Architecture (MCA) bus, an Enhanced ISA (EISA) bus, Video Electronics Standards Association (VESA) local bus, and a Peripheral Component Interconnects (PCI) bus. A computer system/server (512) typically includes a variety of computer system readable media. Such media may be any available media that is accessible by a computer system/server (512), and it includes both volatile and non-volatile media, and removable and non-removable media.

System memory (528) can include computer system readable media in the form of volatile memory, such as random access memory (RAM) (530) and/or cache memory (532). Computer system/server (512) may further include other removable/non-removable, volatile/non-volatile computer system storage media. By way of example only, storage system (534) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (518) by one or more data media interfaces. As will be further depicted and described below, memory (528) may include at least one program product having a set (e.g., at least one) of program modules that are configured to carry out the functions of embodiments of the invention.

Program/utility (540), having a set (at least one) of program modules (542), may be stored in memory (528) by way of example, and not limitation, as well as an operating system, one or more application programs, other program modules, and program data. Each of the operating systems, one or more application programs, other program modules, and program data or some combination thereof, may include an implementation of a networking environment. Program modules (542) generally carry out the functions and/or methodologies of embodiments of the invention as described herein.

Computer system/server (512) may also communicate with one or more external devices (514), such as a keyboard, a pointing device, a display (524), etc.; one or more devices that enable a user to interact with computer system/server (512); and/or any devices (e.g., network card, modem, etc.) that enables computer system/server (512) to communicate with one or more other computing devices. Such communication can occur via Input/Output (I/O) interfaces (522). Still yet, computer system/server (512) can communicate with one or more networks such as a local area network (LAN), a general wide area network (WAN), and/or a public network (e.g., the Internet) via network adapter (520). As depicted, network adapter (520) communicates with the other components of computer system/server (512) via bus (518). It should be understood that although not shown, other hardware and/or software components could be used in conjunction with computer system/server (512). Examples, include, but are not limited to: microcode, device drivers, redundant processing units, external disk drive arrays, RAID systems, tape drives, and data archival storage systems, etc.

Figure 6:
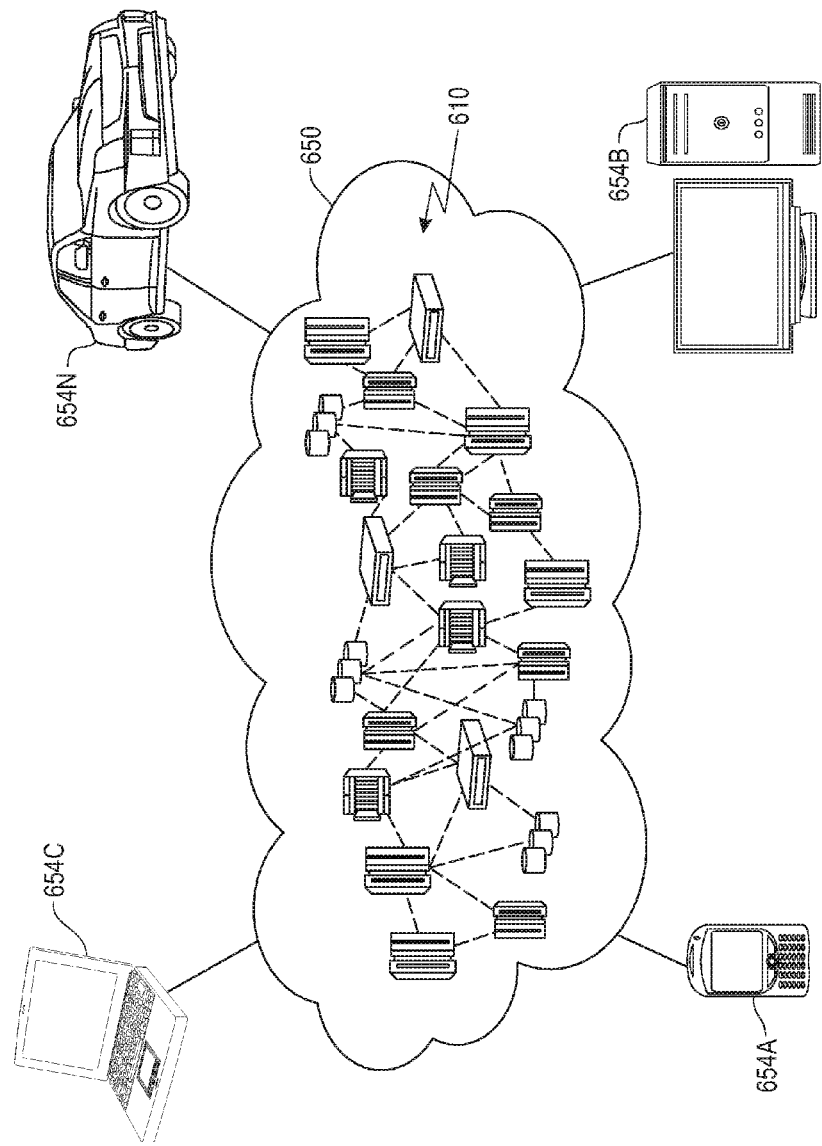
FIG. 6 depicts a cloud computing environment.

Referring now to FIG. 6, illustrative cloud computing environment (650) is depicted. As shown, cloud computing environment (650) comprises one or more cloud computing nodes (610) with which local computing devices used by cloud consumers, such as, for example, personal digital assistant (PDA) or cellular telephone (654A), desktop computer (654B), laptop computer (654C), and/or automobile computer system (654N) may communicate. Nodes (610) may communicate with one another. They may be grouped (not shown) physically or virtually, in one or more networks, such as Private, Community, Public, or Hybrid clouds as described hereinabove, or a combination thereof. This allows cloud computing environment (650) to offer infrastructure, platforms and/or software as services for which a cloud consumer does not need to maintain resources on a local computing device. It is understood that the types of computing devices (654A)-(654N) shown in FIG. 6 are intended to be illustrative only and that computing nodes (610) and cloud computing environment (650) can communicate with any type of computerized device over any type of network and/or network addressable connection (e.g., using a web browser).

Figure 7:
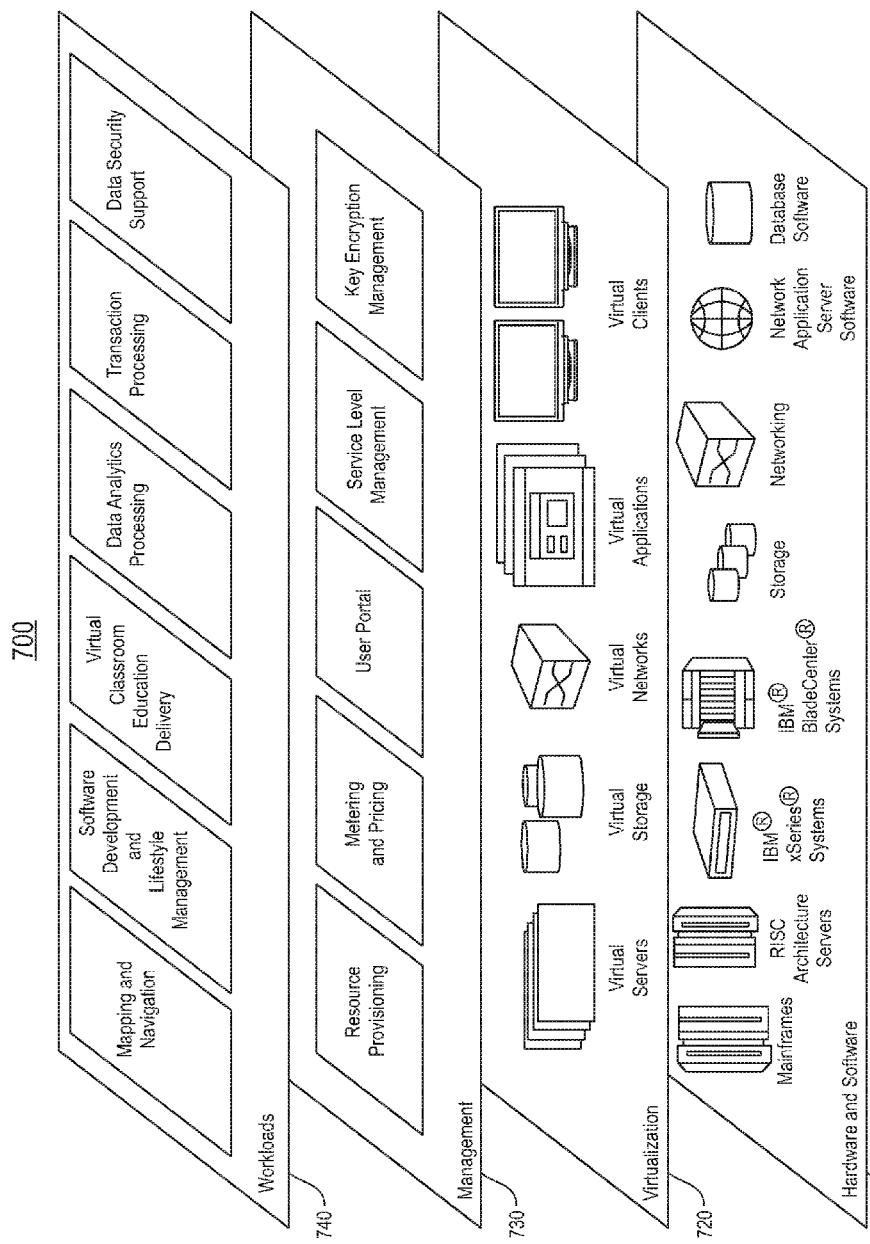
FIG. 7 depicts a set of functional abstraction layers provided by the cloud computing environment.

Referring now to FIG. 7, a set of functional abstraction layers provided by cloud computing environment (700) is shown. It should be understood in advance that the components, layers, and functions shown in FIG. 7 are intended to be illustrative only and embodiments of the invention are not limited thereto. As depicted, the following layers and corresponding functions are provided: hardware and software layer (710), virtualization layer (720), management layer (730), and workload layer (740). The hardware and software layer (710) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (720) provides an abstraction layer from which the following examples of virtual entities may be provided: virtual servers; virtual storage; virtual networks, including virtual private networks; virtual applications and operating systems; and virtual clients.

In one example, a management layer (730) may provide the following functions: resource provisioning, metering and pricing, user portal, service level management, and key management. The functions are described below. Resource provisioning provides dynamic procurement of computing resources and other resources that are utilized to perform tasks within the cloud computing environment. Metering and pricing provides cost tracking as resources that are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Key encryption management provides cloud computing and sharing of data chunks among two more entities such that required encryption and management of associated encrypted data are met.

Workloads layer (740) provides examples of functionality for which the cloud computing environment may be utilized. In the shared pool of configurable computer resources described herein, hereinafter referred to as a cloud computing environment, files may be shared among users within multiple data centers, also referred to herein as data sites. Accordingly, a series of mechanisms are provided within the shared pool to support organization and management of data storage within the cloud computing environment.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flow chart illustrations and/or block diagrams of methods, apparatus (systems), and computer program products according to embodiments of the invention. It will be understood that each block of the flow chart illustrations and/or block diagrams, and combinations of blocks in the flow chart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow chart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions, which execute on the computer or other programmable apparatus, provide processes for implementing the functions/acts specified in the flow chart and/or block diagram block or blocks.

The flow charts and block diagrams in the Figures illustrate the architecture, functionality, and operation of possible implementations of systems, methods, and computer program products according to various embodiments of the present invention. In this regard, each block in the flow charts or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow chart illustration(s), and combinations of blocks in the block diagrams and/or flow chart illustration (s), can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The present invention may be a system, a method, and/or a computer program product. The computer program product may include a computer readable storage medium (or media) having computer readable program instructions thereon for causing a processor to carry out aspects of the present invention.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmissions, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Aspects of the present invention are described herein with reference to flow chart illustrations and/or block diagrams of methods, apparatus (systems), and computer program products according to embodiments of the invention. It will be understood that each block of the flow chart illustrations and/or block diagrams, and combinations of blocks in the flow chart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flow chart and/or block diagram block or blocks.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Accordingly, the implementation of the wrapped encryption keys associated with one or more encryption units supports deduplication of encrypted data in a multiple keyed encryption environment.

Alternative Embodiment

It will be appreciated that, although specific embodiments of the invention have been described herein for purposes of illustration, various modifications may be made without departing from the spirit and scope of the invention. In particular, each encryption unit is separately addressable in the storage system and can be individually accessed. Similarly, once a data chunk is shared, each owning entity can independently stop sharing the chunk without interfering with other owning entities' access to the chunk. For example, in one embodiment, one of the sharing entities can overwrite a logical block address. Furthermore, although the embodiments described herein relate to storage efficiency function, in one embodiment, any functions, such as virus scanning, indexing, etc. that are performed on plaintext may be undertaken as an advanced data function. Accordingly, the scope of protection of this invention is limited only by the following claims and their equivalents.

We claim:

1. A method for reconciling storage efficiency comprising:
    separating encrypted data to be written to a storage system into one or more data chunks;
    storing a first data chunk, including:
        retrieving a first master encryption key for a first owning entity associated with the first data chunk;
        decrypting the first data chunk into plaintext, and transforming the plaintext, including performing one or more advanced data functions on the plaintext;
        creating a first private key, encrypting the transformed plaintext with the first private key, and storing the encrypted transformed plaintext as a first encryption unit;
        creating a first wrapped key using the retrieved first master encryption key, including encrypting the first private key with the retrieved first master key, wherein the first wrapped key limits data access to the first owning entity; and
        storing the first wrapped key as metadata for the first encryption unit; and
    receiving a second data chunk, including:
        identifying the second data chunk as a duplicate of the first data chunk;
        creating a shared encryption unit from the first encryption unit including creating a second wrapped key wherein the second wrapped key limits data access to a second owning entity associated with the second data chunk; and
        storing the second wrapped key as metadata for the shared encryption unit.

2. The method of claim 1, wherein creating the shared encryption unit including the second wrapped key further comprises:
    decrypting the first wrapped key with the first master key to generate an unwrapped first private key; and
    encrypting the unwrapped first private key with a retrieved second master key for the second owning entity;
    wherein the storage of the second wrapped key converts the first encryption unit into the shared encryption unit.

3. The method of claim 2, further comprising accessing the shared encryption unit in response to a request to read data from an accessing entity, including:
    retrieving a stored wrapped key associated with the accessing entity;
    decrypting the retrieved wrapped key with a master key assigned to the accessing entity to generate an unwrapped private key;
    decrypting the requested data into requested data plaintext with the unwrapped private key;
    encrypting the requested data plaintext, and sending the encrypted requested data plaintext to the accessing entity.

4. The method of claim 3, further comprising transforming the accessed data plaintext prior to the encryption, including performing one or more advanced data functions on the accessed data plaintext.

5. A computer program product for data encryption, the computer program product comprising a computer readable storage device having program code embodied therewith, the program code executable by a processing unit to:
    separate encrypted data to be written to a storage system into one or more data chunks;
    store a first data chunk, including:

retrieve a first master encryption key for a first owning entity associated with the first data chunk;
decrypt the first data chunk into plaintext, and transform the plaintext, including program code to perform one or more advanced data functions on the plaintext;
create a first private key, encrypt the transformed plaintext with the first private key, and store the encrypted transformed plaintext as a first encryption unit;
create a first wrapped key using the retrieved first master encryption key, including program code to encrypt the first private key with the retrieved first master key, wherein the first wrapped key limits data access to the first owning entity; and
store the first wrapped key as metadata for the first encryption unit; and
receive a second data chunk, including:
identify the second data chunk as a duplicate of the first data chunk;
create a shared encryption unit from the first encryption unit including create a second wrapped key wherein the second wrapped key limits data access to a second owning entity; and
store the second wrapped key as metadata for the shared encryption unit.

6. The computer program product of claim 5, wherein the creation of the shared encryption unit including the second wrapped key further comprises program code to:
decrypt the first wrapped key with the first master key to generate an unwrapped first private key; and
create a second wrapped key, further comprising program code to encrypt the unwrapped first private key with a retrieved second master key;
wherein the storage of the second wrapped key converts the first encryption unit into the shared encryption unit.

7. The computer program product of claim 6, further comprising program code to access the shared encryption unit in response to a request to read data from an accessing entity, including program code to:
retrieve a stored wrapped key associated with the accessing entity;
decrypt the retrieved wrapped key with a master key assigned to the accessing entity to generate an unwrapped private key;
decrypt the requested data into requested data plaintext with the unwrapped private key;
encrypt the requested data plaintext, and send the encrypted requested data plaintext to the accessing entity.

8. The computer program product of claim 7, further comprising program code to transform the accessed data plaintext prior to the encryption, including program code to perform one or more advanced data functions on the accessed data plaintext.

9. A system comprising:
a processor in communication with data storage for efficient storage of encrypted data;
a programmable hardware device in communication with the processor, the programmable hardware device to:
separate encrypted data to be written to a storage system into one or more data chunks;
store a first data chunk, including:
retrieve a first master encryption key for a first owning entity associated with the first data chunk;
decrypt the first data chunk into plaintext, and transform the plaintext, including the programmable hardware device to perform one or more advanced data functions on the plaintext;
create a first private key, encrypt the transformed plaintext with the first private key, and store the encrypted transformed plaintext as a first encryption unit;
create a first wrapped key using the retrieved first master encryption key, including the programmable hardware device to encrypt the first private key with the retrieved first master key, wherein the first wrapped key limits data access to the first owning entity; and
store the first wrapped key as metadata for the first encryption unit; and
receiving a second data chunk, including:
identify the second data chunk as a duplicate of the first data chunk:
create a shared encryption unit from the first encryption unit including create a second wrapped key wherein the second wrapped key limits data access to a second owning entity; and
store the second wrapped key as metadata for the shared encryption unit.

10. The system of claim 9, wherein the creation of the shared encryption unit including the second wrapped key further comprises the programmable hardware device to:
decrypt the first wrapped key with the first master key to generate an unwrapped first private key; and
wherein to create a second wrapped key, further comprises the programmable hardware device to encrypt the unwrapped first private key with a retrieved second master key;
wherein the storage of the second wrapped key converts the first encryption unit into the shared encryption unit.

11. The system of claim 10, further comprising the programmable hardware device to access the shared encryption unit in response to a request to read data from an accessing entity, including the programmable hardware device to:
retrieve a stored wrapped key associated with the accessing entity;
decrypt the retrieved wrapped key with a master key assigned to the accessing entity to generate an unwrapped private key;
decrypt the requested data into requested data plaintext with the unwrapped private key;
encrypt the requested data plaintext, and send the encrypted requested data plaintext to the accessing entity.

12. The system of claim 11, further comprising the programmable hardware device to transform the accessed data plaintext prior to the encryption, including the programmable hardware device to perform one or more advanced data functions on the accessed data plaintext.

* * * * *